United States Patent
Olaru (10) Patent No.: US 7,165,965 B2
(45) Date of Patent: Jan. 23, 2007

(54) NOZZLE TIP AND SEAL (75) Inventor: George Olaru, Toronto (CA)

(73) Assignee: Mold-Masters Limited, Georgetown (CA)

(*) Notice: Subject to any disclaimer, the term of this patent is extended or adjusted under 35 U.S.C. 154(b) by 310 days.

(21) Appl. No.: 10/728,872

(22) Filed: Dec. 8, 2003

(65) Prior Publication Data
US 2004/0258788 A1 Dec. 23, 2004

Related U.S. Application Data

(60) Provisional application No. 60/431,714, filed on Dec. 9, 2002.

(51) Int. Cl.
*B29C 45/20* (2006.01)
(52) U.S. Cl. .................. 425/549; 264/328.15; 425/564
(58) Field of Classification Search ................ 425/549, 425/562, 564; 264/328.15
See application file for complete search history.

(56) References Cited

U.S. PATENT DOCUMENTS

| | | | |
|---|---|---|---|
| 2,865,050 A | 12/1958 | Strauss | |
| 3,488,810 A | 1/1970 | Gellert | |
| 3,677,682 A | 7/1972 | Putlowski | |
| 3,716,318 A | 2/1973 | Erik et al. | |
| 3,741,704 A | 6/1973 | Beasley | |
| 3,952,927 A | 4/1976 | Schaumburg et al. | |
| 4,004,871 A | 1/1977 | Hardy | |
| 4,010,903 A | 3/1977 | Sakuri et al. | |
| 4,013,393 A | 3/1977 | Gellert | |
| 4,043,740 A | 8/1977 | Gellert | |

(Continued)

FOREIGN PATENT DOCUMENTS

CA    2082700    5/1994

(Continued)

OTHER PUBLICATIONS

Daniel Frenkler and Henry K. Zawistowski—RAPRA Technology Ltd., "Hot Runners in Injection Moulds," (2001).

(Continued)

*Primary Examiner*—Tim Heitbrink
(74) *Attorney, Agent, or Firm*—McDonnell Boehnen Hulbert & Berghoff LLP (57) ABSTRACT

A nozzle for an injection molding apparatus is provided. The nozzle includes a nozzle body, a heater, a tip, a tip surrounding piece and a seal piece. The nozzle body defines a nozzle body melt passage, which is adapted to be in fluid communication with an upstream melt source. The heater is thermally connected to the nozzle body for heating melt in the nozzle body melt passage. The tip is removably connected to the nozzle body. The tip defines a tip melt passage therethrough. The tip melt passage is downstream from and in fluid communication with the nozzle body melt passage, and is adapted to be upstream from and in fluid communication with a mold cavity in a mold component. The tip surrounding piece is removably connected with respect to the nozzle body. The tip surrounding piece is spaced from said tip. The seal piece is positioned between the tip and the tip surrounding piece. The seal piece forms a seal with the tip and with the tip surrounding piece to inhibit melt leakage between the seal piece and the tip and between the seal piece and the tip surrounding piece, so that, in use, at least a portion of the tip and the tip surrounding piece are separated by an air gap.

24 Claims, 4 Drawing Sheets

U.S. PATENT DOCUMENTS

| | | |
|---|---|---|
| 4,053,271 A | 10/1977 | Gellert |
| 4,173,448 A | 11/1979 | Rees et al. |
| 4,212,627 A | 7/1980 | Gellert |
| 4,268,240 A | 5/1981 | Rees et al. |
| 4,268,241 A | 5/1981 | Rees et al. |
| 4,279,588 A | 7/1981 | Gellert |
| 4,286,941 A | 9/1981 | Gellert |
| 4,306,852 A | 12/1981 | Mateev et al. |
| 4,312,630 A | 1/1982 | Travaglini |
| 4,318,686 A | 3/1982 | Morgan |
| 4,330,258 A | 5/1982 | Gellert |
| 4,368,028 A | 1/1983 | Grish et al. |
| 4,412,807 A | 11/1983 | York |
| 4,450,999 A | 5/1984 | Gellert |
| 4,517,453 A | 5/1985 | Tsutsumi |
| 4,652,230 A | 3/1987 | Osuna-Diaz |
| 4,662,837 A | 5/1987 | Anderson |
| 4,663,811 A | 5/1987 | Gellert |
| 4,768,283 A | 9/1988 | Gellert |
| 4,768,945 A | 9/1988 | Schmidt et al. |
| 4,771,164 A | 9/1988 | Gellert |
| 4,781,572 A | 11/1988 | Boring |
| 4,787,836 A | 11/1988 | Osuna-Diaz et al. |
| 4,832,593 A | 5/1989 | Brown |
| 4,875,848 A | 10/1989 | Gellert |
| 4,902,218 A | 2/1990 | Leonard et al. |
| 4,911,636 A | 3/1990 | Gellert |
| 4,925,384 A | 5/1990 | Manner |
| 4,945,630 A | 8/1990 | Gellert |
| 4,950,154 A | 8/1990 | Moberg |
| 4,954,072 A | 9/1990 | Zimmerman |
| 4,981,431 A | 1/1991 | Schmidt |
| 5,015,170 A | 5/1991 | Gellert |
| 5,028,227 A | 7/1991 | Gellert et al. |
| 5,030,084 A | 7/1991 | Gellert et al. |
| 5,053,271 A | 10/1991 | Mori et al. |
| 5,067,893 A | 11/1991 | Osuna-Diaz |
| 5,135,377 A | 8/1992 | Gellert |
| 5,139,724 A | 8/1992 | Hofstetter et al. |
| 5,141,696 A | 8/1992 | Osuna-Diaz |
| 5,208,052 A | 5/1993 | Schmidt et al. |
| 5,208,228 A | 5/1993 | Ok et al. |
| 5,238,378 A | 8/1993 | Gellert |
| 5,254,305 A | 10/1993 | Fernandez et al. |
| 5,268,184 A | 12/1993 | Gellert |
| 5,269,677 A | 12/1993 | Gauler |
| 5,299,928 A | 4/1994 | Gellert |
| 5,324,191 A | 6/1994 | Schmidt |
| 5,334,008 A | 8/1994 | Gellert |
| 5,360,333 A | 11/1994 | Schmidt |
| 5,374,182 A | 12/1994 | Gessner |
| 5,421,716 A | 6/1995 | Gellert |
| 5,443,381 A | 8/1995 | Gellert |
| 5,474,439 A | 12/1995 | McGrevy |
| 5,492,467 A | 2/1996 | Hume et al. |
| 5,501,594 A | 3/1996 | Glozer et al. |
| 5,505,613 A | 4/1996 | Krummenacher |
| 5,518,393 A | 5/1996 | Gessner |
| 5,545,028 A | 8/1996 | Hume et al. |
| 5,554,395 A | 9/1996 | Hume et al. |
| 5,569,475 A | 10/1996 | Adas et al. |
| 5,652,003 A | 7/1997 | Gellert |
| 5,658,604 A | 8/1997 | Gellert et al. |
| 5,674,439 A | 10/1997 | Hume et al. |
| 5,686,122 A | 11/1997 | Huntington et al. |
| 5,695,793 A | 12/1997 | Bauer |
| 5,700,499 A | 12/1997 | Bauer |
| 5,707,667 A | 1/1998 | Galt et al. |
| 5,736,171 A | 4/1998 | McGrevy |
| 5,795,599 A | 8/1998 | Gellert |
| 5,804,228 A | 9/1998 | Kofsman et al. |
| 5,811,140 A | 9/1998 | Manner |
| 5,820,899 A | 10/1998 | Gellert et al. |
| 5,834,041 A | 11/1998 | Sekine et al. |
| 5,845,853 A | 12/1998 | Frideman |
| 5,849,343 A | 12/1998 | Gellert et al. |
| 5,871,785 A | 2/1999 | Van Boekel |
| 5,871,786 A | 2/1999 | Hume et al. |
| 5,879,727 A | 3/1999 | Puri |
| 5,885,628 A | 3/1999 | Swenson et al. |
| 5,894,025 A | 4/1999 | Lee et al. |
| 5,895,669 A | 4/1999 | Seres, Jr. et al. |
| 5,925,386 A | 7/1999 | Moberg |
| 5,941,637 A | 8/1999 | Maurer |
| 5,948,450 A | 9/1999 | Swenson et al. |
| 5,955,121 A | 9/1999 | Gellert et al. |
| 5,980,234 A | 11/1999 | Harley |
| 5,980,237 A | 11/1999 | Swenson et al. |
| 5,984,661 A | 11/1999 | Vorkoper |
| 6,003,182 A | 12/1999 | Song |
| 6,009,616 A | 1/2000 | Gellert |
| 6,017,209 A | 1/2000 | Gellert et al. |
| 6,022,210 A | 2/2000 | Gunther |
| 6,030,202 A | 2/2000 | Gellert et al. |
| 6,036,467 A | 3/2000 | Jameson |
| 6,050,806 A | 4/2000 | Ko |
| 6,074,195 A | 6/2000 | Belous |
| 6,089,468 A | 7/2000 | Bouti |
| 6,113,381 A | 9/2000 | Gellert et al. |
| 6,135,757 A | 10/2000 | Jenko |
| 6,143,358 A | 11/2000 | Singh et al. |
| 6,164,945 A | 12/2000 | Ishibashi et al. |
| 6,164,954 A | 12/2000 | Mortazavi et al. |
| 6,220,851 B1 | 4/2001 | Jenko |
| 6,227,461 B1 | 5/2001 | Schroeder et al. |
| 6,234,783 B1 | 5/2001 | Shibata et al. |
| 6,245,278 B1 | 6/2001 | Lausenhammer et al. |
| 6,254,377 B1 | 7/2001 | Kazmer et al. |
| 6,261,084 B1 | 7/2001 | Schmidt |
| 6,264,460 B1 | 7/2001 | Wright et al. |
| 6,273,706 B1 | 8/2001 | Gunther |
| 6,287,107 B1 | 9/2001 | Kazmer et al. |
| 6,309,208 B1 * | 10/2001 | Kazmer et al. ............. 425/562 |
| 6,315,549 B1 | 11/2001 | Jenko et al. |
| 6,318,990 B1 | 11/2001 | Gellert et al. |
| 6,331,106 B1 | 12/2001 | Helldin |
| 6,358,038 B1 | 3/2002 | Rozenberg |
| 6,358,039 B1 | 3/2002 | Manner et al. |
| 6,394,785 B1 | 5/2002 | Ciccone |
| 6,419,116 B1 | 7/2002 | Eigler et al. |
| 6,428,305 B1 | 8/2002 | Jenko |
| 6,533,571 B1 | 3/2003 | Fikani |
| 6,609,902 B1 | 8/2003 | Blais et al. |
| 6,709,262 B1 | 3/2004 | Fong |
| 6,726,467 B1 | 4/2004 | Lefebure |
| 6,769,901 B1 | 8/2004 | Babin et al. |
| 6,789,745 B1 | 9/2004 | Babin et al. |
| 6,821,112 B1 | 11/2004 | Eigler et al. |
| 6,832,909 B1 | 12/2004 | Bazzo et al. |
| 6,869,276 B1 | 3/2005 | Babin et al. |
| 6,921,257 B1 | 7/2005 | Olaru |
| 6,921,259 B1 | 7/2005 | Sicilia et al. |
| 6,962,492 B1 | 11/2005 | Olaru |
| 6,971,869 B1 | 12/2005 | Olaru |
| 6,988,883 B1 | 1/2006 | Babin et al. |
| 2001/0033044 A1 | 10/2001 | Fikani |
| 2003/0008034 A1 | 1/2003 | Niewels |
| 2003/0082264 A1 | 5/2003 | Babin et al. |
| 2003/0118688 A1 | 6/2003 | Bazzo et al. |
| 2003/0235638 A1 | 12/2003 | Gellert |
| 2004/0058031 A1 | 3/2004 | Niewels |
| 2004/0071817 A1 * | 4/2004 | Fischer et al. ............. 425/564 |
| 2004/0131721 A1 | 7/2004 | Babin et al. |
| 2004/0137107 A1 | 7/2004 | Babin et al. |

| | | | |
|---|---|---|---|
| 2004/0146598 A1 | 7/2004 | Sicilia et al. | |
| 2004/0208949 A1 | 10/2004 | Niewels | |
| 2004/0258788 A1 | 12/2004 | Olaru | |
| 2005/0106283 A1 | 5/2005 | Olaru | |
| 2005/0118298 A1 | 6/2005 | Babin et al. | |
| 2005/0136151 A1 | 6/2005 | Babin | |
| 2005/0214403 A1 | 9/2005 | Olaru | |

FOREIGN PATENT DOCUMENTS

| | | |
|---|---|---|
| CA | 2190569 | 5/1998 |
| CA | 2261367 | 8/2000 |
| CA | 2358148 | 3/2003 |
| CA | 2473920 | 8/2003 |
| DE | 032 45 571 A1 | 6/1984 |
| DE | 296 02 484 | 5/1996 |
| DE | 196 08 676 | 1/1997 |
| DE | 100 08 722 A1 | 8/2001 |
| DE | 100 37 739 A1 | 2/2002 |
| EP | 0 590 677 A1 | 4/1994 |
| EP | 0 638 407 A1 | 2/1995 |
| EP | 0 743 158 A1 | 11/1996 |
| EP | 0 750 975 A1 | 1/1997 |
| EP | 0 835 176 B1 | 4/1998 |
| EP | 0 873 841 A2 | 10/1998 |
| EP | 0 920 969 A1 | 6/1999 |
| EP | 0 743 158 B1 | 8/1999 |
| EP | 0 962 296 A2 | 12/1999 |
| EP | 1 188 537 A2 | 3/2002 |
| EP | 1 321 274 A1 | 6/2003 |
| FR | 2537497 | 6/1984 |
| GB | 1 540 698 | 2/1979 |
| JP | 05-261770 | 10/1992 |
| JP | 05-177664 | 7/1993 |
| JP | 05-309695 | 11/1993 |
| JP | 06-143358 | 5/1994 |
| JP | 07-148786 | 6/1995 |
| JP | 08-090598 | 4/1996 |
| JP | 09-123222 | 5/1997 |
| JP | 10034708 | 2/1998 |
| JP | 10-264222 | 10/1998 |
| JP | 10-296798 | 11/1998 |
| JP | 11-254488 | 9/1999 |
| JP | 2002-273768 | 9/2002 |
| JP | 2002-307492 | 10/2002 |
| JP | 2003-11173 | 1/2003 |
| JP | 2003-11174 | 1/2003 |
| JP | 2003-11176 | 1/2003 |
| JP | 2003-071873 | 3/2003 |
| WO | WO 84/00922 | 3/1984 |
| WO | WO 97/02129 | 1/1997 |
| WO | WO 00/48814 | 8/2000 |
| WO | WO 01/28750 A1 | 4/2001 |
| WO | WO 01/78961 A1 | 10/2001 |
| WO | WO 02/40245 A1 | 5/2002 |
| WO | WO 03/004243 A1 | 1/2003 |
| WO | WO 03/028973 A1 | 4/2003 |
| WO | WO 03/028974 A1 | 4/2003 |
| WO | WO 03/070446 A1 | 8/2003 |
| WO | WO 03/086734 A1 | 10/2003 |
| WO | WO 2004/12923 A2 | 2/2004 |
| WO | WO 2005/090051 A1 | 9/2005 |

OTHER PUBLICATIONS

Ewikon, Hotrunner Systems for Large Parts, pp. 2-11 (May 2000).
Ewikon, Hotrunner Systems for the Packaging and Medical Industry, pp. 2-7 (Jun. 2001).
Ewikon, HPS III Single Tips, 230 V Externally Heated, "HPS III-SE High Performance Single Tips, 230 V With Tip Sealing Technology," pp. 2-9 (Mar. 2002).
Ewikon, HPS IIII-VT Nozzles, 230 V Externally Heated, "For Multi-Cavity Applications and Close Cavity Spacing," pp. 2-7 (Oct. 2001).
Ewikon, HPS III-NV Valve Gate Systems, "All Advantages of the Valve Gate Technology in a Most Compact System," p. 209 (Oct. 2001).
Ewikon, Instruction Manual for Ewikon Hotrunner Systems, date unknown.
Ewikon, Product Guide, "Internally Heated Hotrunner Systems," pp. 2-7 (Oct. 2000).
H.P. Manner, "Nadelverschlußdusen fur kurze Zykluszeit," *Kunststoffe* 85(2):166-168 (1995).
Husky Injection Molding Systems, S.A., 750 Series.
Hydraulic Injection Molding Machinery, Cincinnati Milacron pamphlet (1984).
J.D. Robinson "Gating and Cooling Techniques for Polypropylene," Plastics, pp. 47-51 (1965).
Kona Corporation Catalog entitled, "Kona Bushing for Sprueless Molding," pp. 1-24 (Jun. 2001).
"Mold Hotrunner Solutions," Product illustration of a Guided Mechanism, date unknown.
Press Release entitled "Mold-Masters Introduces the New Accu-Gate Virtually Eliminating Gate Wear," (Dec. 2002).
Redacted: Images and information from "Gunther Hot Runner Technology," taken from Gunther website (Aug. 2003).
PCT Search Report for PCT/CA03/01154, mailed Dec. 3, 2004.
PCT Search Report for WO 03/70446 (Application No. PCT/CA03/00244), mailed May 16, 2003.
Ewikon Brochure 2000, Außenbeheizte Heißkanalduse, 230 V, fur schnelle Farbwechsel, 3 pgs.
Machine Translation from PAJ Website for JP-06-143358, published May 24, 1994.
Redacted letter and attached figure addressed to Mold Masters Limited from the representative of Mr. Maurizio Bazzo dated Dec. 21, 2001.

* cited by examiner

NOZZLE TIP AND SEAL

This application claims the benefit of U.S. Provisional Application No. 60/431,714 filed on Dec. 9, 2002.

FIELD OF THE INVENTION

This invention relates to an injection molding apparatus, and more particularly to a hot runner nozzle for an injection molding apparatus.

BACKGROUND OF THE INVENTION

A hot runner injection molding apparatus typically includes nozzles that are heated to maintain melt therein at a controlled temperature. The nozzles are typically in contact with a mold component that defines one or more mold cavities. The mold cavities in the mold component are filled with melt that first passes through the nozzles. The mold component is then typically cooled in order to solidify the melt in the mold cavities, thus forming a plurality of molded parts, which are then ejected from the mold cavities.

Because the nozzles are typically heated, and the mold component is cooled at least for a portion of an injection molding cycle, it is desirable to provide a relatively low heat transfer from the nozzles into the mold component. Many nozzle constructions have been proposed in the past to address this issue. An example of such a nozzle construction is shown in U.S. Pat. No. 5,299,928 (Gellert). Gellert proposes a nozzle having a tip through which melt flows and a separate tip retainer piece that retains the tip in place. The tip retainer is made from a material that has a different thermal conductivity than that of the tip. While the configuration proposed by Gellert was an improvement over the prior art, undesirable heat losses can still occur from the tip through to the mold plate.

Another proposed nozzle construction is described in U.S. patent application publication 2003/0118688 (Bazzo et al.) Bazzo et al. describes a nozzle having a tip and an external hollow element around the tip that contacts the mold to form a seal therewith. The tip and the external hollow element do not contact one another directly, and are separated by a gap. There are several problems with this design however. During an injection There are several problems with this design however. During an injection molding operation, melt will accumulate in the gap. During a colour changeover, the accumulated melt in the gap will be difficult to clean out without removing at least the external hollow element from the nozzle, which will extend the time required to effect the colour changeover. Further, the melt in the gap can burn or otherwise degrade after a period of time. The melt can then migrate out of the gap and make its way into the mold cavity, which will negatively impact the quality of the molded article.

U.S. Pat. Nos. 5,545,028 and 5,554,395, both to Hume et al, describe multi-piece nozzle tip assemblies including a tip, a tip retainer and a seal piece. The tip retainer is spaced from the tip along a portion of their respective lengths, however, a region of contact exists where the tip retainer retains the tip. A seal piece is provided between the tip and either the mold plate or the tip retainer, to prevent melt from filling the space between the tip and the tip retainer. However, the tip can still incur heat losses through contact with the tip retainer.

Thus, there is a continuing need for new nozzle constructions that inhibit heat losses out of the tip.

SUMMARY OF THE INVENTION

In a first aspect, the invention is directed to a nozzle for an injection molding apparatus, comprising a nozzle body, a heater, a tip, a tip surrounding piece and a seal piece. The nozzle body defines a nozzle body melt passage, which is adapted to be in fluid communication with an upstream melt source. The heater is thermally connected to the nozzle body for heating melt in the nozzle body melt passage. The tip is removably connected to the nozzle body. The tip defines a tip melt passage therethrough. The tip melt passage is downstream from and in fluid communication with the nozzle body melt passage, and is adapted to be upstream from and in fluid communication with a mold cavity in a mold component. The tip surrounding piece is removably connected with respect to the nozzle body. The tip surrounding piece is spaced from said tip. The seal piece is positioned between the tip and the tip surrounding piece. The seal piece forms a seal with the tip and with the tip surrounding piece to inhibit melt leakage between the seal piece and the tip and between the seal piece and the tip surrounding piece, so that, in use, at least a portion of the tip and the tip surrounding piece are separated by an air gap.

In a second aspect, the invention is directed to a nozzle for an injection molding apparatus, comprising a nozzle body, a heater, a tip, a tip surrounding piece and a seal piece. The nozzle body defines a nozzle body melt passage, which is adapted to be in fluid communication with an upstream melt source. The heater is thermally connected to the nozzle body for heating melt in the nozzle body melt passage. The tip is removably connected to the nozzle body. The tip defines a tip melt passage therethrough. The tip melt passage is downstream from and in fluid communication with the nozzle body melt passage, and is adapted to be upstream from and in fluid communication with a mold cavity in a mold component. The tip surrounding piece is removably connected with respect to the nozzle body. The tip surrounding piece and the tip are spaced from each other by a gap. The seal piece is positioned between the tip and the tip surrounding piece. The seal piece seals against both the tip and the tip surrounding piece to inhibit leakage of melt therepast into at least a portion of the gap.

In a third aspect, the invention is directed to a nozzle for an injection molding apparatus, comprising a nozzle body, a heater, a tip, a tip surrounding piece and a seal piece. The nozzle body defines a nozzle body melt passage, which is adapted to be in fluid communication with an upstream melt source. The heater is thermally connected to the nozzle body for heating melt in the nozzle body melt passage. The tip is removably connected to the nozzle body. The tip defines a tip melt passage therethrough. The tip melt passage is downstream from and in fluid communication with the nozzle body melt passage, and is adapted to be upstream from and in fluid communication with a mold cavity in a mold component. The tip surrounding piece is removably connected with respect to the nozzle body. The tip surrounding piece and the tip are spaced from each other by a gap. The seal piece is positioned between the tip and the tip surrounding piece. The seal piece forms a seal with the tip and with the tip surrounding piece to inhibit melt leakage between the seal piece and the tip and between the seal piece and the tip surrounding piece, so that, in use, at least a portion of said tip and at least a portion of said tip surrounding piece are separated by an air gap. The tip surrounding piece retains the tip in place through the seal piece.

DESCRIPTION OF THE DRAWINGS

For a better understanding of the present invention and to show more clearly how it may be carried into effect, reference will now be made by way of example to the accompanying drawings, in which.

DESCRIPTION OF THE PREFERRED EMBODIMENT

Figure 1:
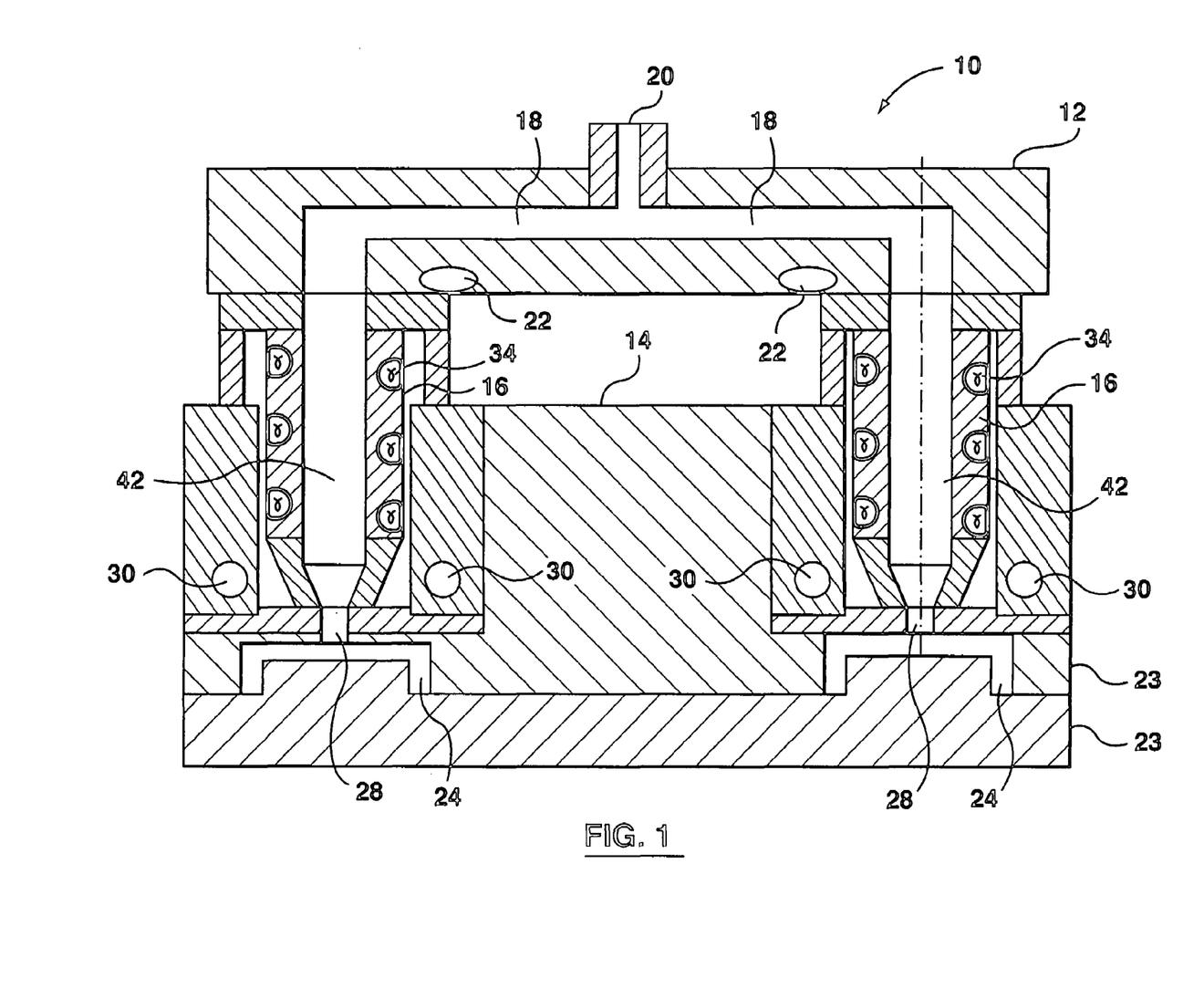
FIG. 1 is a sectional view of injection molding apparatus having a plurality of nozzles in accordance with a first embodiment of the present invention.

Reference is made to FIG. 1, which shows an injection molding apparatus 10, which includes a runner component 12, a mold component 14, a plurality of nozzles 16 in accordance with a first embodiment of the present.

The runner component 12 includes a melt runner system composed of a plurality of runners 18, which transfer melt from a main runner inlet 20 to the nozzles 16. The runner component 12 may be heated by a heater 22.

The mold component 14 is made up of a plurality of mold plates 23, which together define a plurality of mold cavities 24. A gate 28 into each mold cavity 24 is defined in the mold component 14. Each gate 28 is positioned downstream from one of the nozzles 16.

A plurality of cooling channels 30 may be included in the mold component 14. The cooling channels 30 transport a cooling fluid throughout the mold component 14 to cool and solidify melt in the mold cavities 24.

Figure 2:
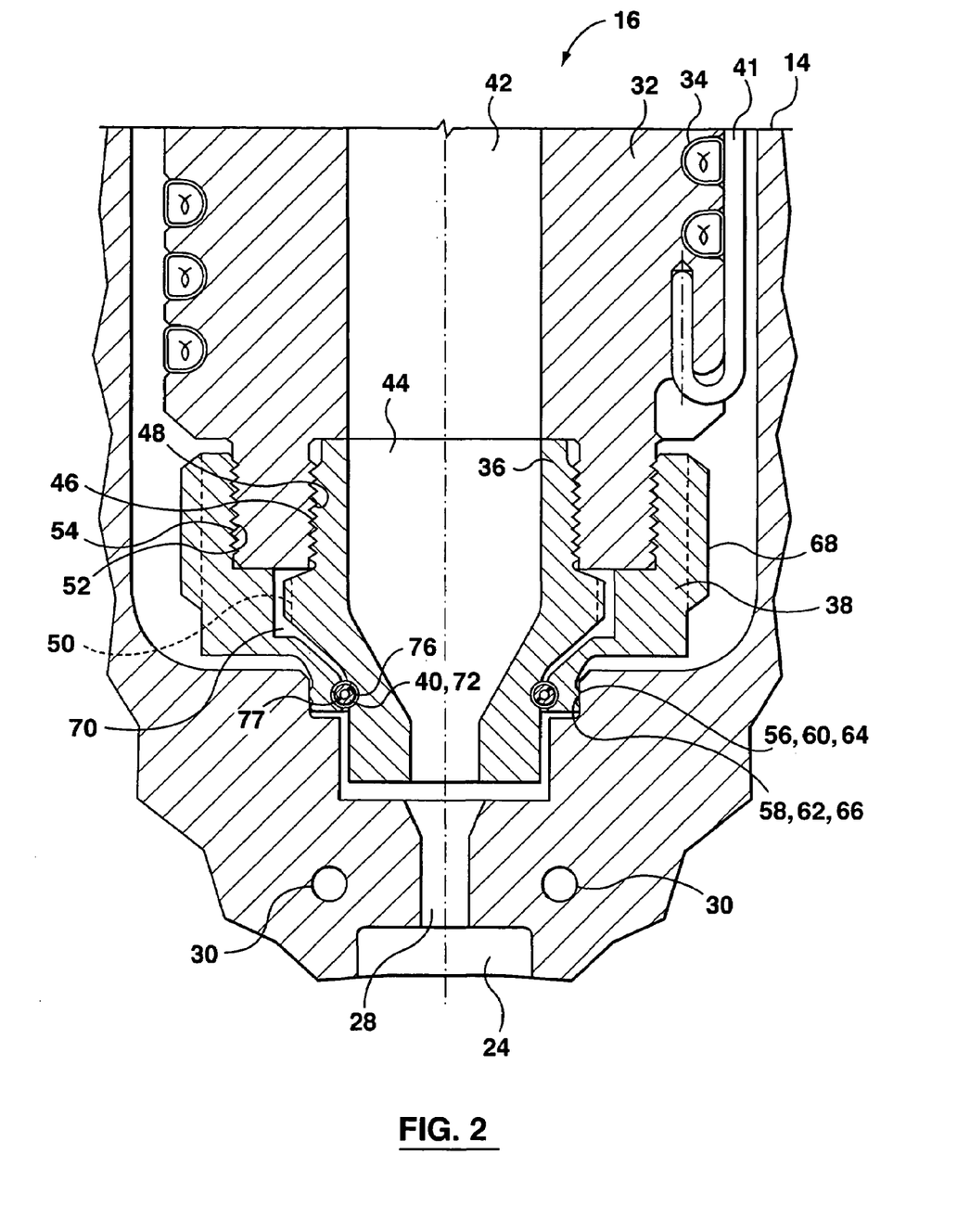
FIG. 2 is a magnified sectional view of a portion of the nozzle shown in FIG. 1.

Reference is made to FIG. 2. Each nozzle 16 transfers melt from the runner component 12 to one of the mold cavities 24 in the mold component 14. Each nozzle 16 includes a nozzle body 32, a heater 34, a tip 36, a tip surrounding piece 38, a seal piece 40 and an optional thermocouple 41.

The nozzle body 32 defines a nozzle body melt passage 42 that receives melt from one of the runners 18. The nozzle body 32 may be made from a single piece of material, such as a thermally conductive metal. It is alternatively possible, however, for the nozzle body 32 to be made from a plurality of components, depending on the specific configuration desired.

The heater 34 is connected to the nozzle body 32 for heating melt in the nozzle 16. The heater 34 may be any suitable kind of heater, such as a resistive wire heater, or a sleeve heater, as long as it is thermally connected to the nozzle body 32, ie. the heater 34 is connected such that heat is transferable from the heater 34 to the nozzle body 32. For example, the heater 34 may wrap around the nozzle body 32 in a groove on the outer surface of the nozzle body 32.

The tip 36 defines a tip melt passage 44, and is connected to the nozzle body 32 so that the tip melt passage 44 is in fluid communication with and downstream from the nozzle body melt passage 42.

As melt passes through and exits the tip 36, it can cause wear to the tip 36, particularly at the outlet end of the tip melt passage 44. The tip 36 may be made removably connected to the nozzle body 32, so that the tip 36 can be removed and replaced as necessary without requiring the replacement of the entire nozzle body 32 due to tip wear.

The removable connection of the tip 36 to the nozzle body 32 may be made in any suitable way. For example, the tip 36 may be connected to the nozzle body 32 by means of a first threaded portion 46 on the tip 36 and a corresponding second threaded portion 48 on the nozzle body 32. In the embodiment shown in FIG. 2, the tip 36 is externally threaded, and the nozzle body 32 is internally threaded. Alternatively, however, the tip 36 and the nozzle body 32 may be threaded in any suitable way.

The tip 36 may be made from a wear resistant material, to resist wear that can occur as a result of the melt flow therethrough. For example, the tip 36 may be made from Be—Cu (Beryllium-Copper), which is a wear resistant, material.

The tip 36 may also be made from a tip material having a relatively high thermal conductivity to facilitate the conduction of heat from the heater 34 to the melt in the tip melt passage 44. Some examples of suitable materials for the tip 36 are Be—Cu (Beryllium-Copper), Beryllium-free Copper such as, for example, Ampco 940™, TZM (Titanium/Zirconium carbide), Aluminum or Aluminum-based alloys, Inconel™, Molybdenum or suitable Molybdenum alloys, H13, mold steel or AerMet 100™. Be—Cu is a material of construction for the tip 36 that has both suitably high thermal conductivity and suitably high wear-resistance.

The tip 36 may include a tool engagement portion 50 for receiving a tool (not shown), to facilitate the installation and removal of the tip 36 with respect to the nozzle body 32.

The tip surrounding piece 38 is connected to the nozzle body 32. Optionally, the tip surrounding piece 38 may be made removably connectable to the nozzle body 32. For example, the tip surrounding piece 38 may include a third threaded portion 52 which mates with a corresponding fourth threaded portion 54 on the nozzle body 32.

In the embodiment shown in FIG. 2, the threaded portion 52 is internally threaded, and the threaded portion 54 is externally threaded. Alternatively, however, the threaded portions 52 and 54 may be threaded in any suitable fashion for the removable attachment of the tip surrounding piece 38 to the nozzle body 32.

It is contemplated that in an alternative configuration, (not shown), the tip 36 and the tip surrounding piece 38 could be made whereby a first threaded portion and a third threaded portion could mate with a common second threaded portion on the nozzle body 32, that is adapted to receive both.

The tip surrounding piece 38 provides at least one of several functions, namely, sealing against melt leakage out of the space between the tip 36 and the gate 28, and aligning the nozzle 16 with respect to the gate 28. Preferably, the tip surrounding piece 38 performs both functions.

With respect to the sealing function, the tip surrounding piece 38 may include a first sealing surface 56, which cooperates with a corresponding second sealing surface 58 on the mold component 14. The seal formed by the first and second sealing surfaces 56 and 58 inhibits melt leakage therebetween. The seal may be any suitable type of seal. For example, the first and second sealing surfaces 56 and 58 may contact each other to form a mechanical seal. Alternatively, the first and second sealing surfaces 56 and 58 may cooperate to form a gap seal. A gap seal functions as follows. The first sealing surface 56 and the second sealing surface 58 do not actually contact each other, but are spaced apart slightly, leaving a gap therebetween. The gap inhibits melt flow between the two surfaces 56 and 58, however some melt may leak therebetween. The gap is sized, however, to provide a pressure drop that is too high for the melt to flow all the way past the seal. As an alternative to an individual mechanical seal or an individual gap seal, the first and second sealing surfaces 56 and 58 may mate to form a series of two or more seals, that can include one or more mechanical seals and one or more gap seals. The gap seal is further described in U.S. patent publication 2003-0082264 A1, which is hereby incorporated by reference.

With respect to the alignment function, the tip surrounding piece 38 may include a first alignment surface 60, which cooperates with a second alignment surface 62 on the mold component 14. The first alignment surface 60 may, for example, comprise an outer cylindrical surface 64 on the tip surrounding piece 38, which mates with a bore 66 in the mold component 14. The first alignment surface 58 may be the same surface as the first sealing surface 56. The second alignment surface 62 may be the same surface as the second sealing surface 58.

The tip surrounding piece 38 may include a tool engagement portion 68 for receiving a tool (not shown), to facilitate the installation and removal of the tip surrounding piece 38 with respect to the nozzle body 32.

Typically, for at least some portion of an injection molding cycle, the melt in the mold component 14 and the melt in the nozzle 16 are maintained at different temperatures. For example, the mold component 14 may be cooled to solidify the melt in the mold cavity 24. However, the nozzle 16 may be heated to keep the melt contained therein hot and ready for the next injection phase. In order to reduce unwanted heat transfer between the nozzle 16 and the mold component 14, the tip surrounding piece 38 may be made from a tip surrounding piece material that is comparatively less thermally conductive than the material of the tip 36. Suitable materials for the tip surrounding piece 38 include titanium, stainless steel, and chrome steel. Other alternative materials include ceramics and plastics. Other suitable materials for the tip surrounding piece 38 are disclosed in U.S. Pat. No. 5,879,727 (Puri), which is hereby incorporated by reference. Puri discloses such materials for use as an insulative layer for a nozzle.

The tip surrounding piece 38 may be made from the same material as the tip 38, however. For example, the second material may be made from H13 or mold steel. Regardless of the material of manufacture for the tip surrounding piece 38, the tip surrounding piece 38 may be configured to have a relatively small contact surface area with the mold component 14 at the sealing surface 56 and/or the alignment surface 60, to reduce heat transfer between the tip surrounding piece 38 and the mold component 14.

The tip surrounding piece 38 may be subject to wear from sliding movement between either the first and second sealing surfaces 56 and 58 or the first and second alignment surfaces 60 and 62. Such movement can occur as a result of the repeated cycles of thermal expansion and contraction of the nozzle 16 that occur during an injection molding operation. The tip surrounding piece 38 is preferably made from a wear resistant material so as to resist the wear that is incurred during use. In light of the above considerations, the tip surrounding piece 38 may be made from a material having a low thermal conductivity and high wear resistance.

The tip surrounding piece 38 is spaced from the tip 36. Because the tip surrounding piece 38 is positioned to be in more direct thermal contact with the mold component 14 than is the tip 36, the tip surrounding piece 38 is likely to have a lower average temperature than the tip 36. For example, in the embodiment shown in FIG. 2, the tip 36 is spaced from the mold component 14, whereas the tip surrounding piece 38 is in direct contact with the mold component 14. By spacing the tip surrounding piece 38 entirely from the tip 36 and thus having no direct contact between them, heat losses from the tip 36 are reduced.

Furthermore, the seal piece is positioned between the tip 36 and the tip surrounding piece 38, and seals against melt leakage between the tip 36 and tip surrounding piece 38, so that an air gap 70 is maintained between the tip 36 and tip surrounding piece 38 at least along a portion of their respective lengths. The air gap 70 thermally insulates the tip 36 from the tip surrounding piece 38, and in so doing, further reduces heat losses from the tip 36.

By reducing the heat losses out of the tip 36, the melt therein can more easily be maintained at a controlled temperature prior to injection into the mold cavity 24. Furthermore, the temperature discrepancy between melt in the tip 36 where temperature is typically lower and melt in the middle portion of the nozzle 16, ie. roughly centrally positioned between the inlet and outlet of the nozzle 16, where temperature is typically higher. Maintaining a more uniform melt temperature improves control of the quality of the molded parts by reducing the likelihood of burning the melt or partially solidifying it in the nozzle 16.

The seal piece 40 may be an o-ring 72 that rests in a first groove 76 and a second groove 77. The first and second grooves 76 and 77 are positioned in the tip 36 and the tip surrounding piece 38 respectively. It is alternatively possible for only one of the tip 36 and the tip surrounding piece 38 to contain a groove sufficient to hold the o-ring 72, instead of having grooves 76 and 77 in both of the pieces 36 and 38.

The seal piece 40 is made from a material that is suitable for sealing against melt leakage. For example, in the form of the o-ring 72, suitable materials include stainless steels, such as Inconel.

The seal piece 40 may also be made from a material that has a thermal conductivity that is lower than that of the tip 36, to reduce the heat loss from the tip 36 to the tip surrounding piece 38.

The seal piece 40 may have a circular cross-section as shown in FIG. 2. Alternatively, however, the seal piece 40 may have other cross-sectional shapes. For example, the seal piece 40 may possess a generally C-shaped cross-section to enhance its flexibility, or to facilitate the assembly of the tip 36, the tip surrounding piece 38 and the seal piece 40 on the nozzle body 32.

Preferably, the seal piece 40 is positioned so as to maximize the length of the air gap 70, to reduce the heat loss from the tip 36. Thus, in the embodiment shown in FIG. 2, the seal piece 40 is positioned adjacent the gate-facing end of the tip surrounding piece 38. In general, the seal piece 40 is preferably placed adjacent the gate-facing end of whichever of the tip 36 and the tip surrounding piece 38 is farther from the gate 28. This positions the seal piece 40 so that the air gap 70 is as large as possible, which provides increased thermal insulation around the tip 36.

Furthermore, by positioning the seal piece 40 proximate the end of the tip surrounding piece 38 reduces or eliminates the accumulation of melt between the tip 36 and tip surrounding piece 38. In this way, the risk is reduced of inadvertently accumulating melt and subsequently burning or otherwise the accumulated melt over time. Accordingly, the risk is reduced of degrading the quality of the molded articles as a result of inadvertently introducing degraded melt into the mold cavity.

Another advantage to positioning the seal piece 40 proximate the end of the tip surrounding piece 38 is that the avoidance of accumulating melt between the tip 36 and the tip surrounding piece 38 facilitates colour changeovers, or other material changeovers where cross-contamination between the old and new melt materials is undesirable.

The thermocouple 41 may be mounted in any suitable way in the nozzle 16 for sensing the temperature of melt flowing through the nozzle 16. The thermocouple 41 sends a signal corresponding to the sensed temperature back to a control system (not shown), which can be used to control the heat output of the heater 34.

Figure 3:
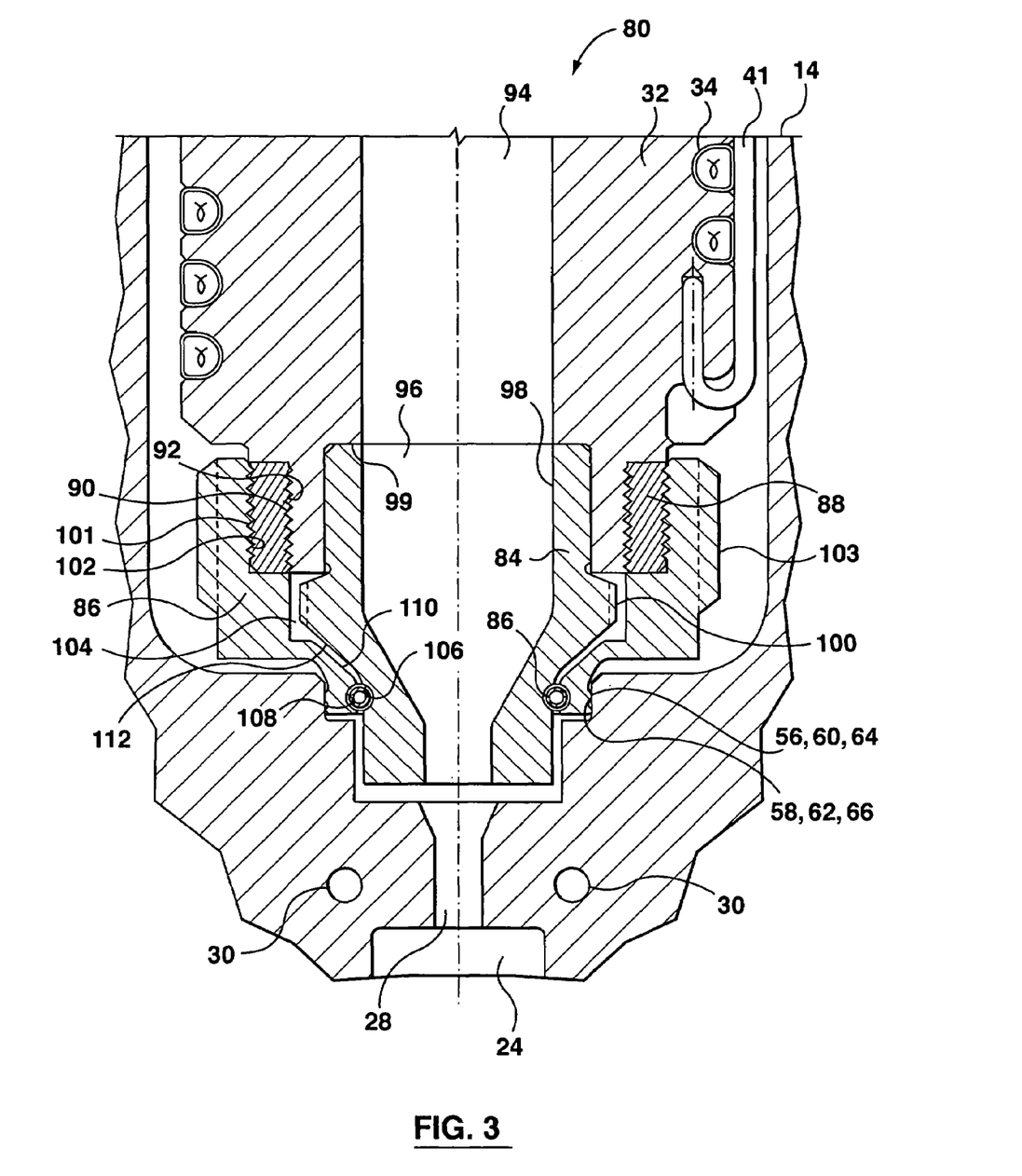
FIG. 3 is a magnified sectional view of a portion of a nozzle in accordance with another embodiment of the present invention.

Reference is made to FIG. 3, which shows a nozzle 80 in accordance with another embodiment of the present invention. The nozzle 80 includes a nozzle body 82, the heater 34, a tip 84, a tip surrounding piece 86, a seal piece 87, an optional fourth piece 88 and the thermocouple 41. The nozzle body 82 may be similar to the nozzle body 32 (FIG. 2), except that the nozzle body 82 may include an optional first threaded portion 90 for receiving a corresponding optional second threaded portion 92 on the fourth piece 88. In the embodiment shown in FIG. 3, the nozzle body 82 does not include a threaded portion for receiving the tip 84.

The nozzle body 82 defines a nozzle body melt passage 94, which may be similar to the nozzle body melt passage 42 (FIG. 2). The heater 34 may be positioned anywhere suitable for heating melt in the nozzle 80.

The tip 84 may be similar to the tip 36 (FIG. 2) and defines a tip melt passage 96 therethrough. The tip 84 does not, however, have a threaded portion thereon for attachment to the nozzle body 82, and is instead retained in place in the nozzle 80 by the tip surrounding piece 86 through the seal piece 87.

The tip 84 fits within a bore 98 in the nozzle body 82, whereby the tip melt passage 96 is in fluid communication with the nozzle body melt passage 94. The tip 84 abuts a shoulder 99 in the bore 98, and forms a seal therewith to prevent melt leakage therebetween from within the nozzle body melt passage 94.

The tip 84 may be made from a relatively thermally conductive material, such as any of the materials used for the tip 36 (FIG. 2).

The tip 84 may be subject to a relatively abrasive or corrosive melt composition. Thus, the tip 84 may be made from a wear resistant material, such as Tungsten Carbide to provide an increased operating life. Depending on the material selected for the tip 84, a threaded portion can be relatively difficult to machine. Furthermore, such a threaded portion can be brittle and subject to premature failure, depending on the material of manufacture for the tip 84. Thus, by making the tip 84 threadless, a greater number of materials are available for its manufacture, such as Tungsten Carbide.

Furthermore, by making the tip 84 threadless, some cost of manufacture is saved for the tip 84 and correspondingly for the nozzle body 82. In addition, by eliminating the need to include threads on the tip 84, the cost of replacement sets of tips 84 can be reduced.

The tip 84 may include an optional tool engagement portion 100, which can be engaged by a tool (not shown) to facilitate the installation in and removal from the bore 98.

The tip surrounding piece 86 may be similar to the tip surrounding piece 38 (FIG. 2), and may include the first sealing surface 56 and the first alignment surface 60 for sealing and aligning with the second sealing surface 58 and the second alignment surface 62 respectively.

The tip surrounding piece 86 retains the tip 84 in place in the bore 98 through the seal piece 87. The tip surrounding piece 86 must be made strong enough to resist the melt pressures that can be exerted axially on the tip 84 during an injection molding operation. Furthermore, the tip surrounding piece 86 may be subject to wear from sliding movement between either the first and second sealing surfaces 56 and 58 or the first and second alignment surfaces 60 and 62. The tip surrounding piece 86 is preferably made from a suitably strong, wear resistant material so as to provide an extended operating life in spite of the wear that is incurred by the tip surrounding piece 86. However, some materials that have high wear resistance, such as Be—Cu may not have relatively low thermal conductivities. To satisfy the potentially conflicting needs of low thermal conductivity and high wear resistance, the tip surrounding piece 86 may attach removably to the optional insulator piece 88 instead of attaching directly to the nozzle body 82.

The optional fourth piece 88 is connected to the nozzle body 82 and receives the tip surrounding piece 86. The fourth piece 88 is an insulator piece, which may be made from a material having a relatively lower thermal conductivity than that of the tip surrounding piece 86. Thus, heat losses are reduced from the nozzle body 82 into the tip surrounding piece 86 and in turn, into the mold component 14.

The insulator piece 88 may be removably connected to the nozzle body 82, by means, for example, of the first and second threaded portions 90 and 92. In addition to the first threaded portion 90, the insulator piece 88 may also include a third threaded portion 101 for mating with a fourth threaded portion 102 on the tip surrounding piece 86.

By having the insulator piece 88 between the tip surrounding piece 86 and the nozzle body 82, the tip surrounding piece 86 may be made from a material having any desired wear resistance, with less regard than would be needed in the embodiment in FIG. 2, as to whether it has a relatively high or low thermal conductivity.

The insulator piece 88 has been described in relation to the embodiment shown in FIG. 3, however, the insulator piece 88 may also be included in any of the other embodiments described herein.

It is alternatively possible for the tip surrounding piece 86 to attach directly to the nozzle body 82, ie. without having the insulator piece 88 therebetween. In that case, it is preferable for the tip surrounding piece 86 to have a relatively lower thermal conductivity than that of the nozzle body 82, and may be made from any of the same materials as the tip surrounding piece 38 (FIG. 2).

The tip surrounding piece 86 may include a tool engagement portion 103 for the engagement of a tool (not shown), to facilitate the installation and removal of the tip surrounding piece with respect to the rest of the nozzle 16.

The tip surrounding piece 86 is entirely spaced from the tip 84, so that the tip 84 and the tip surrounding piece 86 are free of contact with each other. An air gap 104 is maintained between the tip 84 and the tip surrounding piece 86, by the seal piece 87, similar to air gap 70 maintained by the seal piece 40 between the tip 36 and the tip surrounding piece 38 (FIG. 2).

The seal piece 87 may be similar to the seal piece 40 (FIG. 2), and is positioned between the tip 84 and the tip surrounding piece 86 to seal against melt leakage therebetween. In this way, the seal provided by the seal piece 87 with the tip 84 and the tip surrounding piece 86 provides similar advantages to those provided by the seal provided by the seal piece 40 with the tip 36 and the tip surrounding piece 38 (FIG. 2).

In the embodiment shown in FIG. 3, the tip surrounding piece 86 retains the tip 84 through the seal piece 87. Accordingly, in this embodiment, the seal piece 87 possesses sufficient rigidity to maintain the tip 84 in place during an injection molding operation.

The seal piece 87 may be made from a material that has a relatively lower thermal conductivity than that of the tip 84. The seal piece 87 may be positioned within a first groove 106 in the tip 84 and in a second groove 108 in the tip surrounding piece 86. The seal piece 87 cooperates with both of the first and second grooves 106 and 108 to transmit a supporting force from the tip surrounding piece 86 to the tip 84.

In the configuration shown in FIG. 3, to assist in the retaining and supporting function provided by the tip retaining piece 86 on the tip 84 through the seal piece 87, the seal piece 87 may be positioned between generally conical walls 110 and 112 on the tip 84 and the tip surrounding piece 86 respectively.

In a further embodiment that is not shown, it is possible to provide the seal piece 87 between conical walls of the tip 84 and tip surrounding piece 86, without the need for grooves in the conical walls. This is true particularly if the walls are conical beneath (ie. in the direction towards the gate xx) the seal piece 87. Furthermore, the seal piece 87 could be positioned between such conical walls without the need for grooves in the walls, regardless of whether or not the tip is retained in place by the tip surrounding piece.

Figure 4:
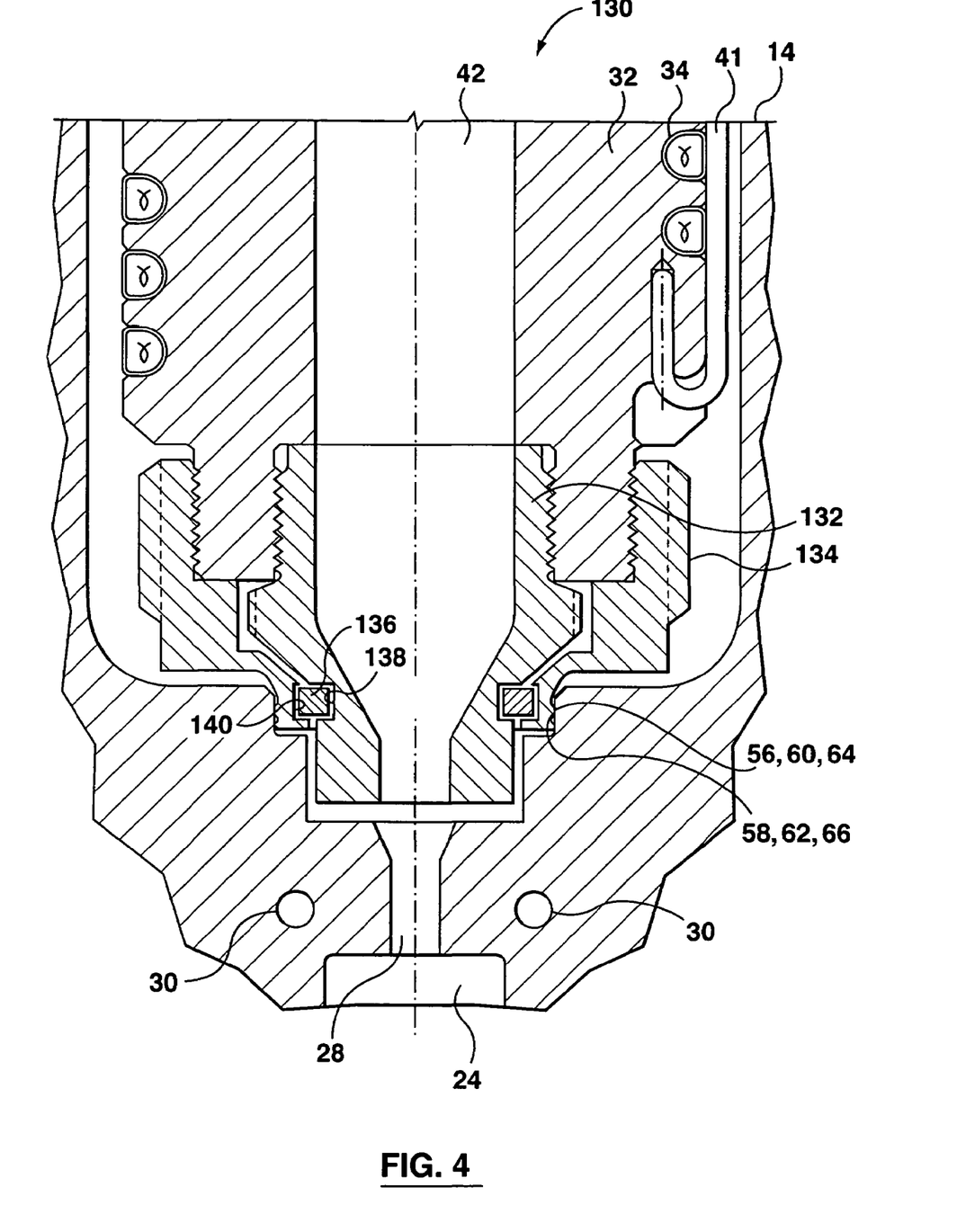
FIG. 4 is a magnified sectional view of a portion of a nozzle in accordance with yet another embodiment of the present invention.

Reference is made to FIG. 4, which shows a nozzle 130 in accordance with another embodiment of the present invention, together with the mold component 14. The nozzle 130 may be similar to any of the nozzles described above, except that the nozzle 130 includes a seal piece 136 that has a square cross-sectional shape. The nozzle 130 includes the nozzle body 32, the heater 34, a tip 132, a tip surrounding piece 134, the seal piece 136, and the thermocouple 41. The embodiment shown in FIG. 4 illustrates that the seal piece 136, may have a shape that is other than circular in cross section. The seal piece 136 may be positioned partially in a first groove 138 in the tip 132, and partially in a second groove 140 in the tip surrounding piece 134. The first and second grooves 138 and 140 may be generally rectangular in cross-section. In an alternative embodiment (not shown), it is possible for the seal piece 136 to be retained within a single groove positioned in either the tip 132 or the tip retaining piece 134.

Aside from the rectangular grooves 138 and 140, the tip 132 and the tip surrounding piece 134 may otherwise be similar to any of the tips and tip surrounding pieces described above in the embodiments shown in FIGS. 2 and 3.

The seal provided by the seal piece 136 with the tip 132 and the tip surrounding piece 134 provides similar advantages to those provided by the seal provided by the seal piece 40 with the tip 36 and the tip surrounding piece 38 (FIG. 2).

Particular examples of an injection molding apparatus are shown in the Figures. It will be appreciated that the injection molding apparatus that incorporates the gating system of the present invention may be any suitable type of injection molding apparatus and is not limited to the examples shown.

While the above description constitutes the preferred embodiments, it will be appreciated that the present invention is susceptible to modification and change without departing from the fair meaning of the accompanying claims.

The invention claimed is:

1. A nozzle for an injection molding apparatus, comprising:
   a nozzle body including a first threaded portion on an outside surface, said nozzle body defining a nozzle body melt passage, wherein said nozzle body melt passage is adapted to be in fluid communication with an upstream melt source;
   a heater, wherein said heater is thermally connected to said nozzle body for heating melt in said nozzle body melt passage;
   a tip removably connected to said nozzle body, wherein said tip defines a tip melt passage therethrough, wherein said tip melt passage is downstream from and in fluid communication with said nozzle body melt passage, and is adapted to be upstream from and in fluid communication with a mold cavity in a mold component;
   a tip surrounding piece having a second threaded portion on an inside surface, such that the tip surrounding piece is removably connected with respect to said nozzle body through mating of the first and second threaded portions; and
   a seal piece positioned between said tip and said tip surrounding piece, wherein said seal piece forms a seal with the tip and with the tip surrounding piece to inhibit melt leakage between the seal piece and the tip and between the seal piece and the tip surrounding piece, so that, in use, at least a portion of said tip and at least a portion of said tip surrounding piece are separated by an air gap.

2. A nozzle as claimed in claim 1, wherein said tip surrounding piece retains said tip in place through said seal piece.

3. A nozzle for an injection molding apparatus, comprising:
   a nozzle body, said nozzle body defining a nozzle body melt passage, wherein said nozzle body melt passage is adapted to be in fluid communication with an upstream melt source;
   a heater, wherein said heater is thermally connected to said nozzle body for heating melt in said nozzle body melt passage;
   a tip, wherein said tip removably contacts said nozzle body, wherein said tip defines a tip melt passage therethrough, wherein said tip melt passage is downstream from and in fluid communication with said nozzle body melt passage, and is adapted to be upstream from and in fluid communication with a mold cavity in a mold component;
   a tip surrounding piece removably connected with respect to said nozzle body, wherein said tip surrounding piece is free of contact with said tip, and wherein said tip surrounding piece and said tip are spaced from each other by a gap; and
   a seal piece positioned between said tip and said tip surrounding piece, wherein said seal piece forms a seal with the tip and with the tip surrounding piece to inhibit melt leakage between the seal piece and the tip and between the seal piece and the tip surrounding piece, so that, in use, at least a portion of said tip and at least a portion of said tip surrounding piece are separated by an air gap.

4. A nozzle as claimed in claim 3, wherein the thermal conductivity of said seal piece is less than the thermal conductivity of said tip.

5. A nozzle as claimed in claim 3, wherein the thermal conductivity of said tip surrounding piece is less than the thermal conductivity of said tip.

6. A nozzle as claimed in claim 3, wherein said tip surrounding piece is configured to contact said mold component.

7. A nozzle as claimed in claim 6 wherein said tip surrounding piece is made of a material that inhibits heat transfer between said nozzle and said mold component.

8. A nozzle as claimed in claim 3, wherein said tip surrounding piece is configured to cooperate with said mold component to seal against melt leakage therebetween.

9. A nozzle as claimed in claim 3, wherein said tip has a first threaded portion for mating with a corresponding second threaded portion on said nozzle body.

10. A nozzle as claimed in claim 9 wherein said tip surrounding piece has a third threaded portion for mating with a corresponding fourth threaded portion on said nozzle body.

11. A nozzle as claimed in claim 3, wherein said tip surrounding piece retains said tip in place through said seal piece.

12. A nozzle as claimed in claim 3, wherein said tip surrounding piece is configured to align said nozzle with respect to a gate into said mold cavity in said mold component.

13. A nozzle as claimed in claim 3, further comprising an insulator piece, wherein said insulator piece is connected to said nozzle body and said tip surrounding piece is connected to said insulator piece.

14. A nozzle as claimed in claim 3, further comprising a fourth piece, wherein said fourth piece is connected to said nozzle body and said tip surrounding piece is connected to said fourth piece and wherein said fourth piece has a lower thermal conductivity than the thermal conductivity of said tip surrounding piece.

15. A nozzle as claimed in claim 3, wherein the seal piece is positioned proximate the gate-facing end of at least one of the tip and the tip surrounding piece.

16. A nozzle for an injection molding apparatus, comprising:
   a nozzle body, said nozzle body defining a nozzle body melt passage, wherein said nozzle body melt passage is adapted to be in fluid communication with an upstream melt source, the nozzle body including a bore having a same bore diameter along its length;
   a heater, wherein said heater is thermally connected to said nozzle body for heating melt in said nozzle body melt passage;
   a tip having a first portion with a same first portion diameter along its length, wherein that the first portion diameter is substantially the same as the bore diameter so that the first portion is received within the bore, wherein the tip is removably connected to said nozzle body, wherein said tip defines a tip melt passage therethrough, wherein said tip melt passage is downstream from and in fluid communication with said nozzle body melt passage, and is adapted to be upstream from and in fluid communication with a mold cavity in a mold component;
   a tip surrounding piece removably connected with respect to said nozzle body, wherein at least a portion of said tip and at least a portion of said tip surrounding piece are separated by an air gap; and
   a seal piece positioned between said tip and said tip surrounding piece, wherein said seal piece seals against both said tip and said tip surrounding piece to inhibit leakage of melt therepast into at least a portion of said gap.

17. A nozzle as claimed in claim 16, wherein the thermal conductivity of said seal piece is less than the thermal conductivity of said tip.

18. A nozzle as claimed in claim 16, wherein said tip has a first threaded portion for mating with a corresponding second threaded portion on said nozzle body.

19. A nozzle as claimed in claim 16, wherein said tip surrounding piece has a third threaded portion for mating with a corresponding fourth threaded portion on said nozzle body.

20. A nozzle as claimed in claim 16, wherein said tip is removably connected to said nozzle body.

21. A nozzle as claimed in claim 16, wherein said tip surrounding piece retains said tip in place through said seal piece.

22. A nozzle as claimed in claim 16, wherein said tip surrounding piece is configured to align said nozzle with respect to a gate into said mold cavity in said mold component.

23. A nozzle as claimed in claim 16, wherein said tip surrounding piece is configured to cooperate with said mold component to seal against melt leakage therebetween.

24. A nozzle as claimed in claim 16, wherein the seal piece is positioned proximate the gate-facing end of at least one of the tip and the tip surrounding piece.

* * * * *